US012670319B2

(12) United States Patent
Shubin et al.

(10) Patent No.: US 12,670,319 B2
(45) Date of Patent: Jun. 30, 2026

(54) AUTO-ORGANIZING OBJECTS BASED ON DOCUMENT ANALYSIS

(71) Applicant: Dropbox, Inc., San Francisco, CA (US)

(72) Inventors: Alexander Shubin, San Jose, CA (US); Stephen Eisenhauer, Seattle, WA (US); Christopher T. Lesniewski-Laas, Oakland, CA (US); Ese Uwhuba, Oakland, CA (US); Ricardo Vazquez, Oakville (CA)

(73) Assignee: Dropbox, Inc., San Francisco, CA (US)

( * ) Notice: Subject to any disclaimer, the term of this patent is extended or adjusted under 35 U.S.C. 154(b) by 156 days.

(21) Appl. No.: 18/536,738

(22) Filed: Dec. 12, 2023

(65) Prior Publication Data

US 2025/0190695 A1     Jun. 12, 2025

(51) Int. Cl.
   *G06F 40/20*       (2020.01)
   *G06F 16/9535*     (2019.01)

(52) U.S. Cl.
   CPC .......... *G06F 40/20* (2020.01); *G06F 16/9535* (2019.01)

(58) Field of Classification Search
   CPC ............................... G06F 40/20; G06F 16/953
   See application file for complete search history.

(56) References Cited

U.S. PATENT DOCUMENTS

| | | |
|---|---|---|
| 9,946,787 B2 | 4/2018 | Bigini et al. |
| 10,402,641 B1 | 9/2019 | Dang et al. |
| 10,891,699 B2 | 1/2021 | Admon |
| 11,036,764 B1 | 6/2021 | Zelenov et al. |
| 11,475,074 B2 | 10/2022 | Paterson et al. |
| 2005/0044487 A1 | 2/2005 | Bellegarda et al. |
| 2012/0290927 A1 | 11/2012 | Sokolan et al. |
| 2015/0199417 A1 | 7/2015 | Ashparie et al. |
| 2016/0217201 A1 | 7/2016 | Hummel et al. |
| 2022/0155924 A1* | 5/2022 | Campbell ............. G06F 3/0484 |

(Continued)

FOREIGN PATENT DOCUMENTS

| | | |
|---|---|---|
| CN | 116521874 A | 8/2023 |
| WO | 2004097678 A1 | 11/2004 |

OTHER PUBLICATIONS

Goren-Bar D., et al., "Supporting User-Subjective Categorization with Self-organizing Maps and Learning Vector Quantization," Journal of the American Society for Information Science and Technology, Feb. 15, 2005 [Published Online: Dec. 15, 2004], vol. 56, No. 4, pp. 345-355, Retrieved from the Internet: URL: https://onlinelibrary.wiley.com/doi/10.1002/asi.20110.

*Primary Examiner* — Qian Yang
(74) *Attorney, Agent, or Firm* — Keller Preece PLLC

(57) ABSTRACT

The present technology provides a solution that can bring organization to the accumulated data and can surface insights derived from an analysis of stored objects. More specifically, the present technology is directed to an object analysis and classification service which is a configurable platform for identifying objects relevant to a topic and providing analysis of the objects relevant to that topic. The object analysis and classification service can include one or more technologies for identifying objects relevant to a topic. The topic can be configured by a user account or can be a predefined topic selected by the user account. The topic can include parameters that can be used by the one or more technologies for identifying objects relevant to a topic and to provide insights defined by the topic.

20 Claims, 6 Drawing Sheets

(56) References Cited

U.S. PATENT DOCUMENTS

| | | | |
|---|---|---|---|
| 2022/0237373 A1 | 7/2022 | Singh Bawa et al. | |
| 2022/0237692 A1 | 7/2022 | Ratan et al. | |
| 2023/0185768 A1 | 6/2023 | Inghelbrecht et al. | |
| 2023/0185769 A1 | 6/2023 | Lichtenberg et al. | |
| 2023/0197220 A1 | 6/2023 | Blarre et al. | |
| 2024/0354711 A1* | 10/2024 | Bouguerra | G06F 40/205 |
| 2025/0028746 A1* | 1/2025 | Cantu | G06F 16/3329 |

* cited by examiner

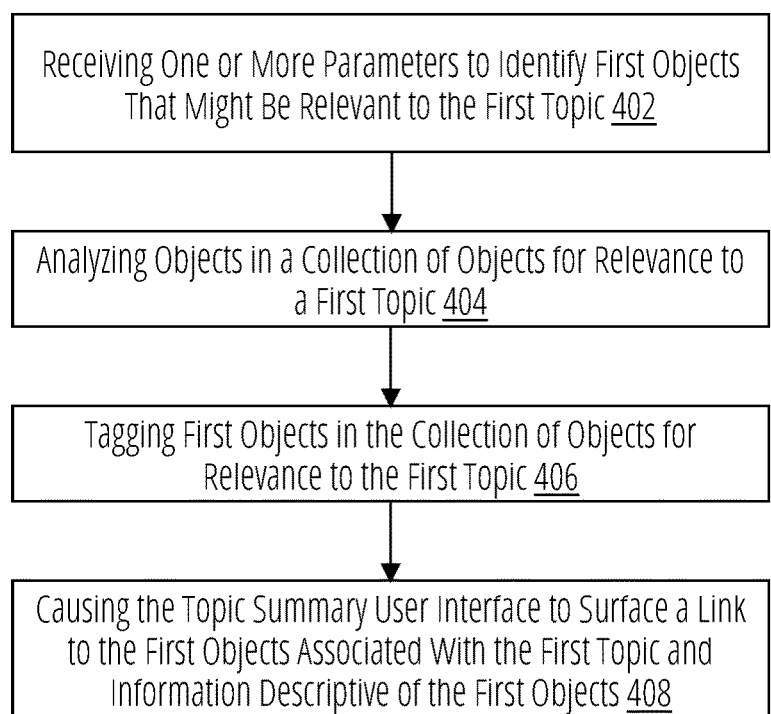

Receiving One or More Parameters to Identify First Objects That Might Be Relevant to the First Topic <u>402</u>

Analyzing Objects in a Collection of Objects for Relevance to a First Topic <u>404</u>

Tagging First Objects in the Collection of Objects for Relevance to the First Topic <u>406</u>

Causing the Topic Summary User Interface to Surface a Link to the First Objects Associated With the First Topic and Information Descriptive of the First Objects <u>408</u>

FIG. 4

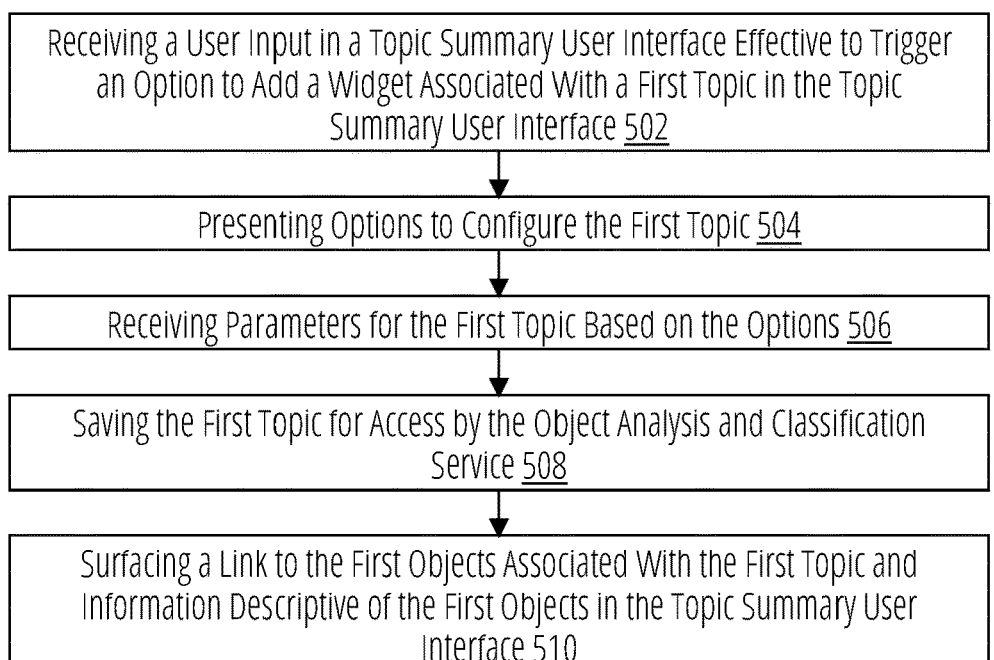

Receiving a User Input in a Topic Summary User Interface Effective to Trigger an Option to Add a Widget Associated With a First Topic in the Topic Summary User Interface 502

Presenting Options to Configure the First Topic 504

Receiving Parameters for the First Topic Based on the Options 506

Saving the First Topic for Access by the Object Analysis and Classification Service 508

Surfacing a Link to the First Objects Associated With the First Topic and Information Descriptive of the First Objects in the Topic Summary User Interface 510

FIG. 5

AUTO-ORGANIZING OBJECTS BASED ON DOCUMENT ANALYSIS

BACKGROUND

User accounts continue to accumulate data. Thanks to relatively cheap storage, user accounts tend to collect many objects such as pictures and documents. While this means that all of these objects remain accessible to user accounts, the organization of such data can be a challenging task. It can be challenging to find even new objects in the relative haystack of accumulated data.

BRIEF DESCRIPTION OF THE SEVERAL VIEWS OF THE DRAWINGS

Details of one or more aspects of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

FIG. 4 illustrates an example routine for automatically organizing objects into topics based on an analysis of a collection of objects in accordance with some aspects of the present technology.

FIG. 5 illustrates an example routine for configuring a topic in accordance with some aspects of the present technology.

DETAILED DESCRIPTION

Figure 1:
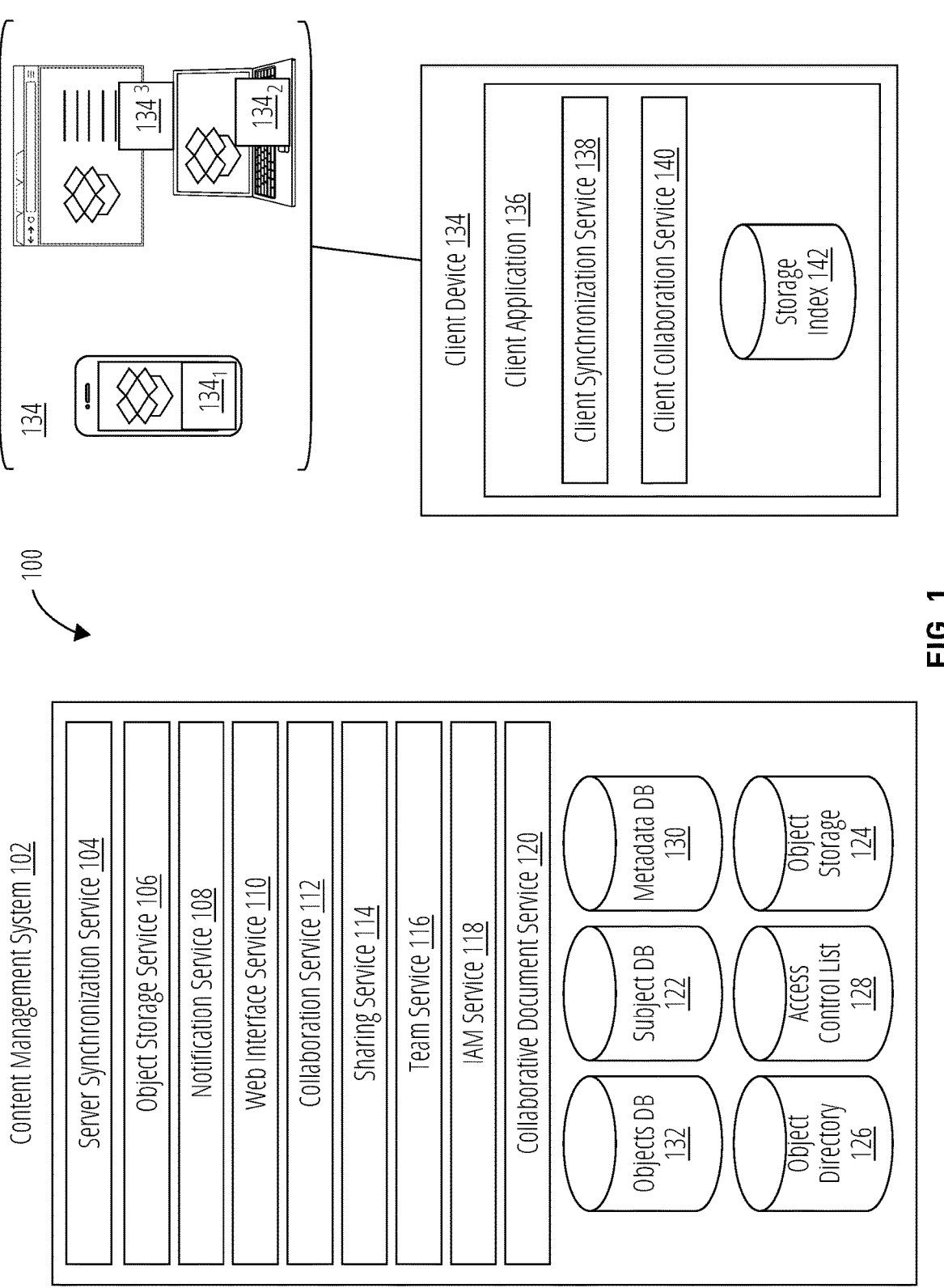
FIG. 1 illustrates an example of a content management system and client devices in accordance with some aspects of the present technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

User accounts continue to accumulate data. Thanks to relatively cheap storage, user accounts tend to collect many objects such as pictures and documents. While this means that all of these objects remain accessible to user accounts, the organization of such data can be a challenging task. It can be challenging to find even new objects in the relative haystack of accumulated data.

The present technology provides a solution that can bring organization to the accumulated data and can surface insights derived from an analysis of stored objects. More specifically, the present technology is directed to an object analysis and classification service which is a configurable platform for identifying objects relevant to a topic and providing analysis of the objects relevant to that topic. The object analysis and classification service can include one or more technologies for identifying objects relevant to a topic.

The topic can be configured by a user account or can be a predefined topic selected by the user account from a plurality of predefined topics. The topic can include parameters that can be used by the one or more technologies for identifying objects relevant to a topic and to provide insights defined by the topic.

The insights pertaining to that topic can be surfaced in a topic summary user interface that both displays some of the insights defined by the topic and also links to the objects relevant to the topic.

The present technology is useful to surface information about objects pertaining to the topics in an easy-to-browse user interface and thereby removes the burden of finding objects of interest in a large collection of objects.

The present technology provides the advantage of more efficiently gathering information pertaining to a topic. Rather than a user entering a search term, receiving search results, browsing search results, and refining search terms, the present technology benefits from the topics that are configured to generate relevant collections and insights without the wasted computing resources that come from running several different searches and individually browsing objects.

Another advantage is that the present technology can be run at times of lower computing demand. Whereas, without the present technology, a user might initiate a search to collect information relevant to a topic during the middle of a work day when computing resources and networking resources are in high demand, the present technology can instead search and analyze documents in a period where computing resources and networking resources are more available.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

In some embodiments the disclosed technology is deployed in the context of a content management system having object synchronization capabilities and collaboration features, among others. An example system 100 configuration is shown in FIG. 1, which depicts content management system 102 interacting with client device 134.

Accounts

Content management system 102 can store objects in association with accounts, as well as perform a variety of object management tasks, such as retrieve, modify, browse, and/or share the object(s). Furthermore, content management system 102 can enable an account to access object(s) from multiple client devices.

Content management system 102 supports a plurality of accounts. A subject (user, group, team, company, etc.) can create an account with content management system, and account details can be stored in subject database 122. Subject database 122 can identify a registered subject by a subject ID, and store profile information for registered subjects in association with the subject ID. In some cases, profile information for registered subjects includes a subject name and/or email address. Subject database 122 can include account management information, such as account type (e.g., various tiers of free or paid accounts), storage space allocated, storage space used, client devices 134 having a registered content management client application 136 resident thereon, security settings, personal configuration settings, etc. In some embodiments, some information associated with an account may not be directly stored, and rather this information can be derived. For example, storage space used might be explicitly stored, or it can be calculated when needed.

In some embodiments, subject database 122 need not store complete information associated with an account for a subject. Some portion of information associated with an account for a subject can also be stored in another database of content management system 102 such as metadata database 130, or in a database external to content management system 102.

Subject database 122 can store groups of accounts associated with a subject. Groups can have permissions based on group permissions statements and/or access control lists, and members of the groups can inherit the permissions. For example, a marketing group can have access to one set of objects while an engineering group can have access to another set of objects. An administrator group can modify groups, modify subject accounts, etc. Groups are also subjects identified by subject ID.

In some embodiments, subject database 122 can be broken into a plurality of tables, indexes and other data structures.

Object Storage

A feature of content management system 102 is the storage of objects, which can be stored in object storage 124. An object generally is any entity that can be recorded in a file system. Objects can be any object including digital data such as documents, collaboration objects, text files, audio files, image files, video files, webpages, executable files, binary files, object directories, folders, zip files, playlists, albums, symlinks, cloud docs, mounts, placeholder objects referencing other objects in content management system 102 or in other content management systems, etc.

In some embodiments, objects can be grouped into a collection, which can refer to a folder including a plurality of objects, or a plurality of objects that are related or grouped by a common attribute.

In some embodiments, object storage 124 is combined with other types of storage or databases to handle specific functions. Object storage 124 can store objects, while metadata regarding the objects can be stored in metadata database 130. Likewise, data regarding where an object is stored in object storage 124 can be stored in object directory 126. Additionally, data regarding changes, access, etc. can be stored in objects database 132. Objects database 132 can also include a subject account identifier that identifies the subject IDs that have access to the object.

In some embodiments, objects database 132 can be broken into a plurality of tables, indexes and other data structures.

Each of the various storages/databases such as object storage 124, object directory 126, objects database 132, and metadata database 130 can be comprised of more than one such storage or database and can be distributed over many devices and locations. Other configurations are also possible. For example, data from object storage 124, object directory 126, objects database 132, and/or metadata database 130 may be combined into one or more object storages or databases or further segmented into additional object storages or databases. Thus, content management system 102 may include more or less storages and/or databases than shown in FIG. 1.

In some embodiments, object storage 124 is associated with at least one object storage service 106, which includes software or other processor executable instructions for managing the storage of objects including, but not limited to, receiving objects for storage, preparing objects for storage, selecting a storage location for the object, retrieving objects from storage, etc. In some embodiments, object storage service 106 can divide an object into smaller chunks for storage at object storage 124. The location of each chunk making up an object can be recorded in object directory 126. Object directory 126 can include a content entry for each object stored in object storage 124. The content entry can be associated with an object ID, which uniquely identifies an object.

In some embodiments, each object and each chunk of an object can also be identified from a deterministic hash function. This method of identifying an object and chunks of objects can ensure that object duplicates are recognized as such since the deterministic hash function will output the same hash for every copy of the same object, but will output a different hash for a different object. Using this methodology, object storage service 106 can output a unique hash for each different version of an object.

Object storage service 106 can also designate or record a parent of an object or a content path for an object in objects database 132. The content path can include the name of the object and/or folder hierarchy associated with the object. For example, the content path can include a folder or path of folders in which the object is stored in a local file system on a client device. In some embodiments, object database might only store a direct ancestor or direct child of any object, which allows a full path for an object to be derived, and can be more efficient than storing the whole path for an object.

While objects are stored in object storage 124 in blocks and may not be stored under a tree like directory structure, such directory structure is a comfortable navigation structure for subjects viewing objects. Object storage service 106 can define or record a content path for an object wherein the "root" node of a directory structure can be any directory with specific access privileges assigned to it, as opposed to a directory that inherits access privileges from another directory.

In some embodiments, a root directory can be mounted underneath another root directory to give the appearance of a single directory structure. This can occur when an account has access to a plurality of root directories. As addressed above, the directory structure is merely a comfortable navigation structure for subjects viewing objects, but does not correlate to storage locations of objects in object storage 124.

While the directory structure in which an account views objects does not correlate to storage locations of the objects at content management system 102, the directory structure can correlate to storage locations of the objects on client device 134 depending on the file system used by client device 134.

As addressed above, a content entry in object directory 126 can also include the location of each chunk making up an object. More specifically, the content entry can include content pointers that identify the location in object storage 124 of the chunks that make up the object.

Object storage service 106 can decrease the amount of storage space required by identifying duplicate objects or duplicate blocks that make up an object or versions of an object. Instead of storing multiple copies, object storage 124 can store a single copy of the object or block of the object, and object directory 126 can include a pointer or other mechanism to link the duplicates to the single copy.

Object storage service 106 can also store metadata describing objects, object types, folders, file path, and/or the relationship of objects to various accounts, collections, or groups in metadata database 130, in association with the object ID of the object.

Object storage service 106 can also store a log of data regarding changes, access, etc. in objects database 132. Objects database 132 can include the object ID of the object and can optionally include a description of the change or access action along with a time stamp or version number and any other relevant data. Objects database 132 can also include pointers to blocks affected by the change or object access. Object storage service 106 can also provide the ability to undo operations, by using an object version control mechanism that tracks changes to objects, different versions of objects (including diverging version trees), and a change history that can be acquired from objects database 132.

Object Synchronization

Another feature of content management system 102 is synchronization of objects with at least one client device 134. Client device(s) 134 can take different forms and have different capabilities. For example, client device 134 can be a computing device having a local file system accessible by multiple applications resident thereon. Client device 134 can be a computing device wherein objects are only accessible to a specific application or by permission given by the specific application, and the objects are typically stored either in an application specific space or in the cloud. Client device 134 can be any client device accessing content management system 102 via a web browser and accessing objects via a web interface. While example client device 134 is depicted in form factors such as a laptop, mobile device, or web browser, it should be understood that the descriptions thereof are not limited to devices of these example form factors. For example a mobile device might have a local file system accessible by multiple applications resident thereon, or might access content management system 102 via a web browser. As such, the form factor should not be considered limiting when considering client 134's capabilities. One or more functions described herein with respect to client device 134 may or may not be available on every client device depending on the specific capabilities of the device—the file access model being one such capability.

In many embodiments, client devices 134 are associated with an account of content management system 102, but in some embodiments client devices 134 can access content using shared links and do not require an account.

As noted above, some client devices can access content management system 102 using a web browser. However, client devices can also access content management system 102 using client application 136 stored and running on client device 134. Client application 136 can include a client synchronization service 138.

Client synchronization service 138 can be in communication with server synchronization service 104 to synchronize changes to objects between client device 134 and content management system 102.

Client device 134 can synchronize content with content management system 102 via client synchronization service 138. The synchronization can be platform agnostic. That is, content can be synchronized across multiple client devices of varying types, capabilities, operating systems, etc. Client synchronization service 138 can synchronize any changes (e.g., new, deleted, modified, copied, or moved objects) to objects in a designated location of a file system of client device 134.

Objects can be synchronized from client device 134 to content management system 102, and vice versa. In embodiments wherein synchronization is from client device 134 to content management system 102, a subject can manipulate objects directly from the file system of client device 134, while client synchronization service 138 can monitor directory on client device 134 for changes to files within the monitored folders.

When client synchronization service 138 detects a write, move, copy, or delete of content in a directory that it monitors, client synchronization service 138 can synchronize the changes to content management storage service 106. In some embodiments, client synchronization service 138 can perform some functions of content management storage service 106 including functions addressed above such as dividing the object into blocks, hashing the object to generate a unique identifier, etc. Client synchronization service 138 can index content within client storage index 142 and save the result in client storage index 142. Indexing can include storing paths plus the object identifier, and a unique identifier for each object. In some embodiments, client synchronization service 138 learns the object identifier from server synchronization service 104, and learns the unique client identifier from the operating system of client device 134.

Client synchronization service 138 can use storage index 142 to facilitate the synchronization of at least a portion of the objects within client storage with objects associated with a subject account on content management system 102. For example, client synchronization service 138 can compare storage index 142 with content management system 102 and detect differences between content on client storage and content associated with a subject account on content management system 102. Client synchronization service 138 can then attempt to reconcile differences by uploading, downloading, modifying, and deleting content on client storage as appropriate. Object storage service 106 can store the changed or new block for the object and update objects database 132, metadata database 130, object directory 126, object storage 124, subject database 122, etc. as appropriate.

When synchronizing from content management system 102 to client device 134, data regarding a mount, modification, addition, deletion, move of an object recorded in objects database 132 can trigger a notification to be sent to client device 134 using notification service 108. When client device 134 is informed of the change, client device 134 can make a request for changes listed in objects database 132 since the last synchronization point known to the client device. When client device 134 determines that it is out of synchronization with content management system 102, client synchronization service 138 requests object blocks including the changes, and updates its local copy of the changed objects.

In some embodiments, storage index 142 stores tree data structures wherein one tree reflects the latest representation of a directory according to server synchronization service 104, while another tree reflects the latest representation of the directory according to client synchronization service 138. Client synchronization service can work to ensure that the tree structures match by requesting data from server synchronization service 104 or committing changes on client device 134 to content management system 102.

Sometimes client device 134 might not have a network connection available. In this scenario, client synchronization service 138 can monitor the linked collection for object changes and queue those changes for later synchronization to content management system 102 when a network connection is available. Similarly, a subject can manually start, stop, pause, or resume synchronization with content management system 102.

Client synchronization service 138 can synchronize all content associated with a particular subject account on content management system 102. Alternatively, client synchronization service 138 can selectively synchronize some of the objects associated with the particular subject account on content management system 102. Selectively synchronizing only some of the objects can preserve space on client device 134 and save bandwidth.

In some embodiments, client synchronization service 138 selectively stores a portion of the objects associated with the particular subject account and stores placeholder objects in client storage for the remainder portion of the objects. For example, client synchronization service 138 can store a placeholder object that has the same filename, path, extension, metadata, of its respective complete object on content management system 102, but lacking the data of the complete object. The placeholder object can be a few bytes or less in size while the respective complete object might be significantly larger. After client device 134 attempts to access the object, client synchronization service 138 can retrieve the data of the object from content management system 102 and provide the complete object to client device 134. This approach can provide significant space and bandwidth savings while still providing full access to a subject's objects on content management system 102.

While the synchronization embodiments addressed above referred to client device 134 and a server of content management system 102, it should be appreciated by those of ordinary skill in the art that a user account can have any number of client devices 134 all synchronizing objects with content management system 102, such that changes to an object on any one client device 134 can propagate to other client devices 134 through their respective synchronization with content management system 102.

Collaboration Features

Another feature of content management system 102 is to facilitate collaboration between subjects. Collaboration features include object sharing, commenting on objects, co-working on objects in real time, instant messaging, providing presence and "seen" state information regarding objects, etc.

Sharing

Content management system 102 can manage sharing objects via sharing service 114. Sharing an object by providing a link to the object can include making the object accessible from any computing device in network communication with content management system 102. However, in some embodiments a link can be associated with access restrictions enforced by content management system 102 and Identity and Access Management (IAM) service 118. Sharing content can also include linking content using sharing service 114 to share content within content management system 102 with at least one additional subject account (in addition to the original subject account associated with the object) so that each subject account has access to the object. The additional subject account can gain access to the content by accepting the content, which will then be accessible through either web interface service 110 or directly from within the directory structure associated with their account on client device 134. The sharing can be performed in a platform agnostic manner. That is, the content can be shared across multiple client devices 134 of varying type, capabilities, operating systems, etc. The content can also be shared across varying types of subject accounts.

To share an object within content management system 102 sharing service 114 can add associate a subject ID of a team or of one or more subject accounts with a content item in objects database 132 associated with the object, thus granting the added subject account(s) access to the object. Sharing service 114 can also remove subject IDs from being permitted to access a content item in objects database 132 to restrict a subject account's access to the object. Sharing service 114 can record object identifiers, subject identifiers given access to an object, and access levels in objects database 132. For example, in some embodiments, subject identifiers associated with a single content item can specify different permissions for respective subject identifiers with respect to the associated object.

In some embodiments, content management system 102 can include an access control list 128 which includes a description of complete access rights pertaining to a respective object. An access control list for any respective object in content management system can be derived from objects database 132. In some embodiments, it is not desirable to maintain a persistent access control list 128 for a respective object, as an access control list 128 for a respective object can be derived when needed. In some embodiments, objects can inherit access rights from another object such as ancestor objects.

To share objects outside of content management system 102, sharing service 114 can generate a custom network address, such as a uniform resource locator (URL), which allows any web browser to access the object or collection in content management system 102 without any authentication. To accomplish this, sharing service 114 can include content identification data in the generated URL, which can later be used to properly identify and return the requested object. For example, sharing service 114 can include a token identifying an object ID and optionally a subject ID in the generated URL. Upon selection of the URL, the content identification data included in the URL can be transmitted to content management system 102, which can use the received content identification data to identify the appropriate object and return the object.

In addition to generating the URL, sharing service 114 can also be configured to record in objects database 132 that a URL to the object has been created. In some embodiments, an entry into objects database 132 associated with an object can include a URL flag indicating whether a URL to the object has been created. For example, the URL flag can be a Boolean value initially set to 0 or false to indicate that a URL to the object has not been created. Sharing service 114 can change the value of the flag to 1 or true after generating a URL to the object.

In some embodiments, sharing service 114 can associate a set of permissions to a URL for an object. For example, if a subject attempts to access the object via the URL, sharing service 114 can provide a limited set of permissions for the object. Examples of limited permissions include restrictions that the subject cannot download the object, save the object, copy the object, modify the object, etc. In some embodiments, limited permissions include restrictions that only permit an object to be accessed from with a specified domain, i.e., from within a corporate network domain, or by accounts associated with a specified domain, e.g., accounts associated with a company account (e.g., @acme.com).

In some embodiments, sharing service 114 can also be configured to deactivate a generated URL. For example, each entry into objects database 132 can also include a URL active flag indicating whether the content should be returned in response to a request from the generated URL. For example, sharing service 114 can only return an object requested by a generated link if the URL active flag is set to 1 or true. Thus, access to an object for which a URL has been generated can be easily restricted by changing the value of the URL active flag. This allows a subject to restrict access to the shared object without having to move the object or delete the generated URL. Likewise, sharing service 114 can reactivate the URL by again changing the value of the URL active flag to 1 or true. A subject can thus easily restore access to the object without the need to generate a new URL.

In some embodiments, content management system 102 can designate a URL for uploading an object. For example, a first subject with a subject account can request such a URL, provide the URL to a contributing subject and the contributing subject can upload an object to the first subject's subject account using the URL.

Team Service

In some embodiments content management system 102 includes team service 116. Team service 116 can provide functionality for creating and managing defined teams of subject accounts. Teams can be created for a company, with sub-teams (e.g., business units, or project teams, etc.), and subject accounts assigned to teams and sub-teams, or teams can be created for any defined group of subject accounts. Team service 116 can provide a common shared space for the team, private subject account folders, and access limited shared folders. Team service 116 can also provide a management interface for an administrator to manage collections and objects within team, and can manage subject accounts that are associated with the team. Teams, sub-teams, subject accounts are all given a subject identifier in subject database 122, and the membership to teams by subject accounts is also recorded in subject database 122.

IAM (Identity and Access Management) Service

In some embodiments, content management system 102 includes IAM service 118. IAM service 118 can authenticate a subject account. For subject accounts with multiple levels of rights (e.g. a subject account with subject rights and administrator rights) IAM service 118 can also facilitate explicit privilege escalation to avoid unintentional actions by administrators.

Object Access

Object storage service 106 can receive a token from client application 136 that follows a request to access an object and can return the capabilities permitted to the subject account.

Presence and Seen State

In some embodiments, content management system can provide information about how subjects with which an object is shared are interacting or have interacted with the object. In some embodiments, content management system 102 can report that a subject with which an object is shared is currently viewing the object. For example, client collaboration service 140 can notify notification service 108 when client device 134 is accessing the object. Notifications service 108 can then notify all client devices of other subjects having access to the same object of the presence of the subject of client device 134 with respect to the object.

In some embodiments, content management system 102 can report a history of subject interaction with a shared object. Collaboration service 112 can query data sources such as metadata database 130 and objects database 132 to determine that a subject has saved the object, that a subject has yet to view the object, etc., and disseminate this status information using notification service 108 to other subjects so that they can know who currently is or has viewed or modified the object.

Collaboration service 112 can facilitate comments associated with content, even if an object does not natively support commenting functionality. Such comments can be stored in metadata database 130.

Collaboration service 112 can originate and transmit notifications for subjects. For example, a subject can mention another subject in a comment and collaboration service 112 can send a notification to that subject letting them know that they have been mentioned in the comment. Various other object events can trigger notifications, including deleting an object, sharing an object, etc.

Collaboration service 112 can also provide a messaging platform whereby subjects can send and receive instant messages, voice calls, emails, etc.

Collaboration Objects

In some embodiments content management service can also include collaborative document service 120 which can provide an interactive object collaboration platform whereby subjects can simultaneously create collaboration objects, comment in the collaboration objects, and manage tasks within the collaboration objects. Collaboration objects can be files that subjects can create and edit using a collaboration object editor, and can contain collaboration object elements. Collaboration object elements may include a collaboration object identifier, one or more author identifiers, collaboration object text, collaboration object attributes, interaction information, comments, sharing subjects, etc. Collaboration object elements can be stored as database entities, which allows for searching and retrieving the collaboration objects. Multiple subjects may access, view, edit, and collaborate on collaboration objects at the same time or at different times. In some embodiments this can be managed by requiring two subjects access an object through a web interface and there they can work on the same copy of the object at the same time.

Collaboration Companion Interface

In some embodiments client collaboration service 140 can provide a native application companion interface for the purpose of displaying information relevant to an object being presented on client device 134. In embodiments wherein an object is accessed by a native application stored and executed on client device 134, where the object is in a designated location of the file system of client device 134 such that the object is managed by client application 136, the native application may not provide any native way to display the above addressed collaboration data. In such embodiments, client collaboration service 140 can detect that a subject has opened an object, and can provide an overlay with additional information for the object, such as collaboration data. For example, the additional information can include comments for the object, status of the object, activity of other subjects previously or currently viewing the object. Such an overlay can warn a subject that changes might be lost because another subject is currently editing the object.

In some embodiments, one or more of the services or storages/databases discussed above can be accessed using public or private application programming interfaces.

Certain software applications can access object storage 124 via an application programming interface (API) on behalf of a subject. For example, a software package such as an application running on client device 134, can programmatically make API calls directly to content management system 102 when a subject provides authentication credentials, to read, write, create, delete, share, or otherwise manipulate content.

A subject can view or manipulate content stored in a subject account via a web interface generated and served by web interface service 110. For example, the subject can navigate in a web browser to a web address provided by content management system 102. Changes or updates to content in the object storage 124 made through the web interface, such as uploading a new version of an object, can be propagated back to other client devices associated with the subject's account. For example, multiple client devices, each with their own client software, can be associated with a single account and objects in the account can be synchronized between each of the multiple client devices.

Client device 134 can connect to content management system 102 on behalf of a subject. A subject can directly interact with client device 134, for example when client device 134 is a desktop or laptop computer, phone, television, internet-of-things device, etc. Alternatively or additionally, client device 134 can act on behalf of the subject without the subject having physical access to client device 134, for example when client device 134 is a server.

Some features of client device 134 are enabled by an application installed on client device 134. In some embodiments, the application can include a content management system specific component. For example, the content management system specific component can be a stand-alone client application 136, one or more application plug-ins, and/or a browser extension. However, the subject can also interact with content management system 102 via a third-party application, such as a web browser, that resides on client device 134 and is configured to communicate with content management system 102. In various implementations, the client application 136 can present a subject interface (UI) for a subject to interact with content management system 102. For example, the subject can interact with the content management system 102 via a file system explorer integrated with the file system or via a webpage displayed using a web browser application.

In some embodiments, client application 136 can be configured to manage and synchronize content for more than one account of content management system 102. In such embodiments client application 136 can remain logged into multiple accounts and provide normal services for the multiple accounts. In some embodiments, each account can appear as folder in a file system, and all objects within that folder can be synchronized with content management system 102. In some embodiments, client application 136 can include a selector to choose one of the multiple accounts to be the primary account or default account.

Third Party Services

In some embodiments content management system 102 can include functionality to interface with one or more third party services such as workspace services, email services, task services, etc. In such embodiments, content management system 102 can be provided with login credentials for a subject account at the third party service to interact with the third party service to bring functionality or data from those third party services into various subject interfaces provided by content management system 102.

While content management system 102 is presented with specific components, it should be understood by one skilled in the art, that the architectural configuration of system 100 is simply one possible configuration and that other configurations with more or fewer components are possible. Further, a service can have more or less functionality, even including functionality described as being with another service. Moreover, features described herein with respect to an embodiment can be combined with features described with respect to another embodiment.

While system 100 is presented with specific components, it should be understood by one skilled in the art, that the architectural configuration of system 100 is simply one possible configuration and that other configurations with more or fewer components are possible.

Figure 2:
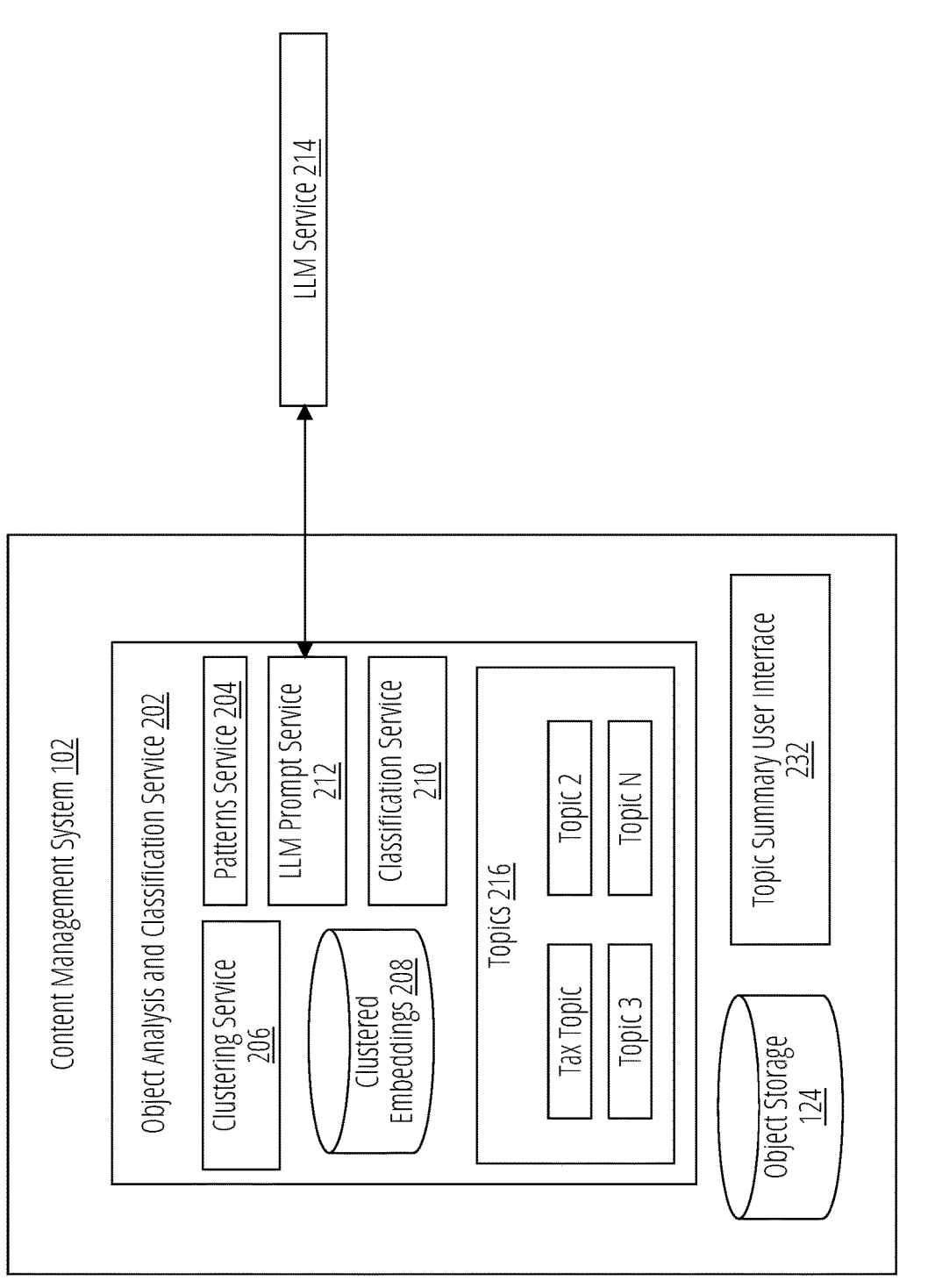
FIG. 2 illustrates additional detail of the content management system where the content management system includes a notification manager in accordance with some aspects of the present technology.

FIG. 2 illustrates additional detail of the content management system where the content management system includes an object analysis and classification service in accordance with some aspects of the present technology. FIG. 2 is provided as an example to aid in describing the present technology. Although a particular arrangement of components is depicted in FIG. 2, the arrangement of such components should not be considered limiting of the present technology unless otherwise specified in the appended claims. For example, while FIG. 2 illustrates the object analysis and classification service as part of the content management system, it will be appreciated by those of ordinary skill in the art that the object analysis and classification service can perform its functions as a platform independently of a content management system. In some embodiments, the object analysis and classification service can be outside of and separate from the content management system, and the object analysis and classification service can access the content management system to analyze the objects therein.

FIG. 2 illustrates an object analysis and classification service 202. The object analysis and classification service 202 is configured to search for, filter, or otherwise identify objects in the collection of objects associated with the user account that might be relevant to a topic. The object analysis and classification service 202 is further configured to analyze objects relevant to a topic and to provide analytics or intelligence based on the objects.

The object analysis and classification service 202 is configured as a platform having a plurality of object analysis services. For example, the object analysis and classification service 202 can include a patterns service 204, a large language mode (LLM) prompt service 212, a clustering service 206, and a classification service 210, etc. The specific use of these services can be informed by one or more topics 216. As will be described in more detail herein, the specific topics 216 can include parameters used to identify the types of documents relevant to a topic and to specify insights to be derived from an analysis of the objects that are relevant to the topic.

The patterns service 204 is configured to review content within objects in the object storage 124 for the existence of data identified by patterns, such as a regular expression (REGEX) matching or text string matching. Some simple examples can be a Social Security number (XXX-XX-XXXX) or a date of birth (XX/XX/XXXX) a telephone number (XXX-XXX-XXXX), etc. In other examples, patterns service 204 can be configured to look for specific data similar to how a data loss platform may identify important information in an enterprise network (hashes of segments of data). The patterns service 204 can evaluate objects associated with a user account stored in the object storage 124 to find examples of data that match patterns defined in one or more topics 216.

The clustering service 206 can be configured to generate clusters of similar objects associated with the user account and stored in object storage 124. For example, the clustering service 206 may identify objects that can be arranged into semantically meaningful clusters such as contracts, receipts, tax documents, photographs, emails, academic papers, presentations, etc. The clusters may even be more granular and separate the types of objects into smaller categories such as by project or other sub-categories (eg., contracts by customer accounts, or receipts or tax documents by relevant date ranges, etc.). The clusters can be created in an embedding space as is well known, and the embeddings for the documents and the clusters can be stored in the clustered embeddings database 208. One of the topics 216 can define categories that can map to one or more clusters of objects in the clustered embeddings database 208.

The object analysis and classification service 202 can also include a classification service 210. The classification service 210 can be an object classifier. In some embodiments, the classification service 210 includes one or more machine learning algorithms trained to identify particular types of objects. In some embodiments, when one of the topics 216 defines a type of object of interest that does not map to a cluster in the cluster embeddings and cannot be identified from patterns within the object, the classification service 210 can request and receive examples of relevant objects and can fine-tune a classification layer of machine learning model to be able to identify other objects that are similar to the examples of relevant objects. The present technology contemplates a framework to make training a machine learning algorithm for a specific purpose more accessible to a user account than a typical machine learning training process undertaken by a data scientist.

In addition to such customized machine learning models, the classification service 210 may have a pre-trained model that can identify certain document attributes that can be utilized. The topic can identify a selection of a machine learning model or an output that a classifier that is accessible to the classification service 210 is able to provide. Alternatively, the user can select to train their own model or classification layer as addressed above and the topic can point to the custom trained model or classification layer.

The object analysis and classification service 202 can also include the large language model (LLM) prompt service 212. Different from the patterns service 204, the clustering service 206, the classification service 210 which are all services pertaining to a specific knowledge base or methodology, the LLM prompt service 212 can be considered a mechanism to make queries of generalized intelligence. The LLM prompt service 212 can be configured to receive a prompt defined by one of the topics 216 and can prompt a large language model (LLM) 214 with a natural language prompt requesting some analysis. For example, an example prompt can ask the LLM service 214 to provide a conclusion as to whether or not a receipt pertains to a childcare expense such that it might be tax deductible. In another example, a prompt can ask the LLM service 214 to return information about payment obligations defined in a contract. Accordingly, the LLM prompt service 212 is configured to provide prompts present in one of the topics 216 and to provide one or more objects that might be relevant to the prompt to the LLM service 214 and can receive a response from the LLM service 214. The response can include information about whether an object is relevant to one of the topics 216 and/or insights that are responsive to parameters configured in one of the topics 216. In this way, the LLM can be used to confirm that objects identified by other services are relevant to the topic, and/or identify objects not identifiable using the other services, and/or can extract intelligence from the objects.

In some aspects, the LLM service 214 utilizes a chat bot-type interface. Accordingly, the object analysis and classification service 202 can provide natural language prompts to the LLM service 214 specifying the input and output that is desired of the LLM service 214. The topics 216 can define the prompts to be provided to the LLM service 214.

The intelligence that can be returned from the LLM can be general or specific depending on the prompt given. For example, a prompt could ask the LLM to summarize the contents of one or more objects, or a prompt could ask the LLM to answer a specific question based on one or more objects.

While not illustrated as a service in FIG. 2, the content management system can be a source of information relevant to one or more topics 216. As addressed with respect to FIG. 1, the content management system 102 can provide APIs to access one or more functions of the content management system 102. For example, the content management system 102 can report on metadata associated with objects relevant to topics-metadata such as object file sizes, user accounts that have access to the object, etc. Additionally, the content management system 102 can report on activity associated with the objects including the amount of time spent working on an object, or information about comments on an object. Additionally, the content management system 102 can provide a search interface to search for one or more objects relevant to a topic.

Figure 3:
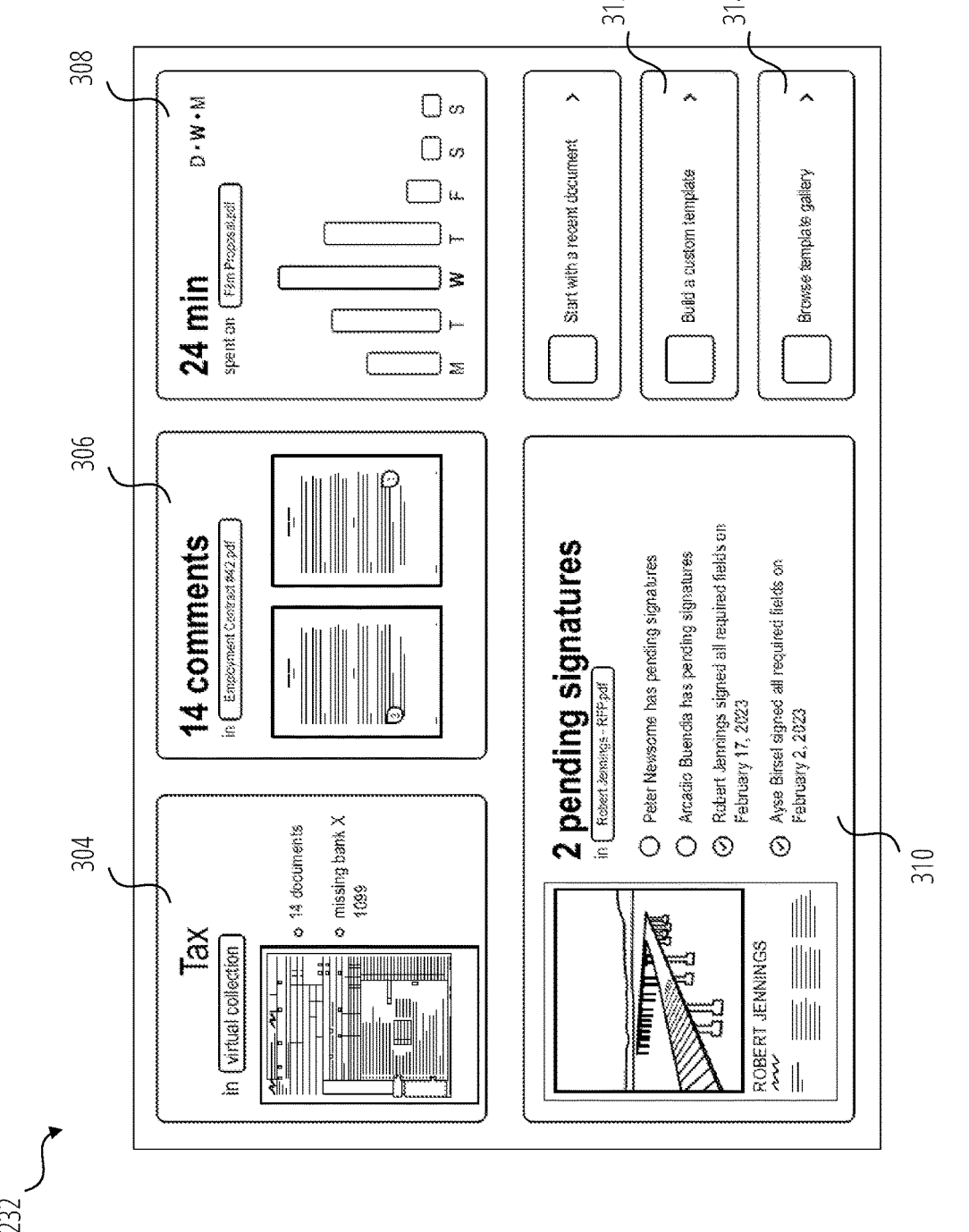
FIG. 3 illustrates an example topic summary user interface in accordance with some aspects of the present technology.

The topic summary user interface 232 can be configured to surface a user interface widget pertaining to a particular topic. An example of the topic summary user interface is illustrated in FIG. 3. The topic summary user interface 232 can include information identifying objects relevant to the topic and/or insights derived from the objects.

FIG. 3 illustrates an example topic summary user interface in accordance with some aspects of the present technology. The arrangement of depicted user interface objects and the presence of functions and features of the user topic summary user interface are illustrated by way of examples of features of the present technology only and should not be considered limiting of the present technology unless specified in the appended claims. Various functions and features can be removed, and other features or functions can be added and still remain within the scope of the present technology.

FIG. 3 illustrates several widgets depicted as note cards in the topic summary user interface 232. For example, the topic summary user interface 232 includes a tax widget 304, working document widget 306, project management widget 308, and signature status widget 310. The widgets can be linked to a respective topic from among topics 216. For example, the tax topic depicted in FIG. 2 can be linked to tax widget 304.

Some of the widgets 304, 306, 308, and 310 can be based on preconfigured topics that can be browsed after a selection of the browse preconfigured topics option 314. For example, signature status widget 310 can be linked to a preconfigured topic that can monitor a signature status of an object. The preconfigured template may require the selection of one or more variables such as an object to monitor and/or a connection to document signature service.

Some of the widgets 304, 306, 308, and 310 can be based on a custom created topic that can be configured after a selection of the custom topic button 312. For example, the tax widget 304 can be linked to a custom configured topic.

A user account can configure a custom topic by identifying a source of objects. In the example of the tax topic, the user account can select their collection of objects at the content management system 102 and email attachments in an email account linked to the content management system 102 or object analysis and classification service 202. The user account might also define types of objects that are relevant. For example, the user account might select documents, receipts, and contracts as classifications of objects from which relevant objects will be selected. These classifications of objects can map to semantic clusters of objects identified by the clustering service 206. The user account might also define patterns or strings common in some tax documents (e.g., "W-2" or "1099", etc.) to be used by the patterns service 204 in evaluating objects. The user account might provide examples of care child invoices from a day care to the classification service 210 so that the classification service 210 can attempt to locate additional of these types of objects. Additionally, the user account can configure a prompt for use by the LLM prompt service 212. For example, the user account can provide all prior year tax documents, and create a prompt wherein the LLM prompt service 212 analyzes the prior year tax documents, and the current year tax documents found by the object analysis and classification service 202 using the parameters of the tax topic and can request the LLM service 214 to identify any documents that might be missing. For example, as shown in tax widget 304, the LLM service 214 may have identified that last year Bank X issued a 1099 form, but that an analogous form has not been identified as part of the tax topic yet.

In some embodiments, the intelligence extracted from objects can be used by other services. For example, an LLM service 214 can extract information needed to fill out tax forms which it can provide to a tax preparation service, such as through one or more APIs or integrations.

FIG. 4 illustrates an example routine for automatically organizing objects into topics based on an analysis of a collection of objects in accordance with some aspects of the present technology. Although the example routine depicts a particular sequence of operations, the sequence may be altered without departing from the scope of the present disclosure. For example, some of the operations depicted may be performed in parallel or in a different sequence that does not materially affect the function of the routine. In other examples, different components of an example device or system that implements the routine may perform functions at substantially the same time or in a specific sequence.

According to some examples, the method includes receiving one or more parameters to identify first objects that might be relevant to the first topic based on the one or more parameters at block 402. For example, the object analysis and classification service 202 illustrated in FIG. 2 may receive one or more parameters associated with the first topic for use in identifying the first objects based on the one or more parameters.

According to some examples, the method includes analyzing objects in a collection of objects for relevance to the first topic at block 404. For example, the object analysis and classification service 202 illustrated in FIG. 2 may analyze objects in a collection of objects for relevance to a first topic.

As addressed above, the first topic can define one or more parameters for objects associated with the first topic. The parameters can be aligned with data already existing and determined by the content management system 102 such as object metadata, object access statistics, or semantic clusters determined by the clustering service 206. The parameters can also be custom parameters including search terms, patterns, or strings to identify in an object, examples of objects for which similar objects should be identified, and/or prompts that can be input to the LLM service 214 to receive insights. In some aspects, the first topic can be selected from a collection of pre-configured topics provided by the object analysis and classification service 202.

The collection of objects from which to identify relevant objects can be any collection of objects. In some examples, the collection of objects is a general collection of objects associated with a user account, such as all or substantially all objects associated with the user account of the content management system 102. The objects can be of diverse object types (directories, images, videos, documents, code, etc.). The objects can be from diverse sources (user accounts, publishers, databases, platforms, services, applications, etc.), too. Objects stored in the content management system 102 can be from just about any source. Additionally, the object analysis and classification service 202 can analyze and identify objects from other services such as email accounts, communication services (e.g., chat or team space services), documents in other cloud platforms, etc. Any source that can be accessed by the object analysis and classification service 202 can be analyzed.

According to some examples, the method includes tagging first objects in the collection of objects for relevance to the first topic at block 406. For example, the object analysis and classification service 202 illustrated in FIG. 2 may tag first objects in the collection of objects for relevance to the first topic.

As addressed herein, there are a number of different techniques and services to determine that an object might be relevant to a topic. These techniques and services can be used alone or in combination. For example, the clustering service can be used to reduce the number of objects that need to be reviewed by other services. If a topic pertains to images, only objects in a cluster of images need to be reviewed for more detailed analysis.

According to some examples, the method includes causing the topic summary user interface to surface a link to the first objects associated with the first topic and information descriptive of the first objects at block 408. For example, the object analysis and classification service 202 illustrated in FIG. 2 may cause the topic summary user interface to surface a link to the first objects associated with the first topic along with information descriptive of the first objects The information descriptive of the first object can include one or more of: a name of the first topic, a number of first objects associated with the first topic, a date range of last modified dates, user accounts with which the first objects are shared, pending action(s) relevant to the first objects, insights derived from the first objects, etc., FIG. 5 illustrates an example routine for configuring a topic in accordance with some aspects of the present technology. Although the example routine depicts a particular sequence of operations, the sequence may be altered without departing from the scope of the present disclosure. For example, some of the operations depicted may be performed in parallel or in a different sequence that does not materially affect the function of the routine. In other examples, different components of an example device or system that implements the routine may perform functions at substantially the same time or in a specific sequence.

According to some examples, the method includes receiving a user input in a topic summary user interface effective to trigger an option to add a widget associated with a first topic in the topic summary user interface at block 502. For example, the topic summary user interface 232 illustrated in FIG. 2 may receive the user input effective to trigger an option to add a widget associated with a first topic in the topic summary user interface.

According to some examples, the method includes presenting options to configure the first topic at block 504. For example, the topic summary user interface 232 illustrated in FIG. 2 may present options to configure the first topic. As addressed herein, the first topic can be a preconfigured topic, or the user account can configure the parameters of a customized topic.

According to some examples, the method includes receiving parameters for the first topic based on the options at block 506. For example, the topic summary user interface 232 illustrated in FIG. 2 may receive receiving parameters for the first topic based on the options. The parameters can be aligned with data already existing and determined by the content management system 102 such as object metadata, object access statistics, or semantic clusters determined by the 206. The parameters can also be custom parameters including search terms, patterns or strings to identify in an object, examples of objects for which similar objects should be identified, and/or prompts that can be input to the LLM service 214 to receive insights.

According to some examples, the method includes saving the first topic for access by the object analysis and classification service at block 508. For example, the topic summary user interface 232 illustrated in FIG. 2 may save the first topic for access by the object analysis and classification service.

According to some examples, the method includes surfacing a link to the first objects associated with the first topic and information descriptive of the first objects in the topic summary user interface at block 510. For example, the topic summary user interface 232 illustrated in FIG. 2 may surface a link to the first objects associated with the first topic and information descriptive of the first objects. The link to the first objects can be the widget or a link within the widget displayed in the topic summary user interface 232.

Figure 6:
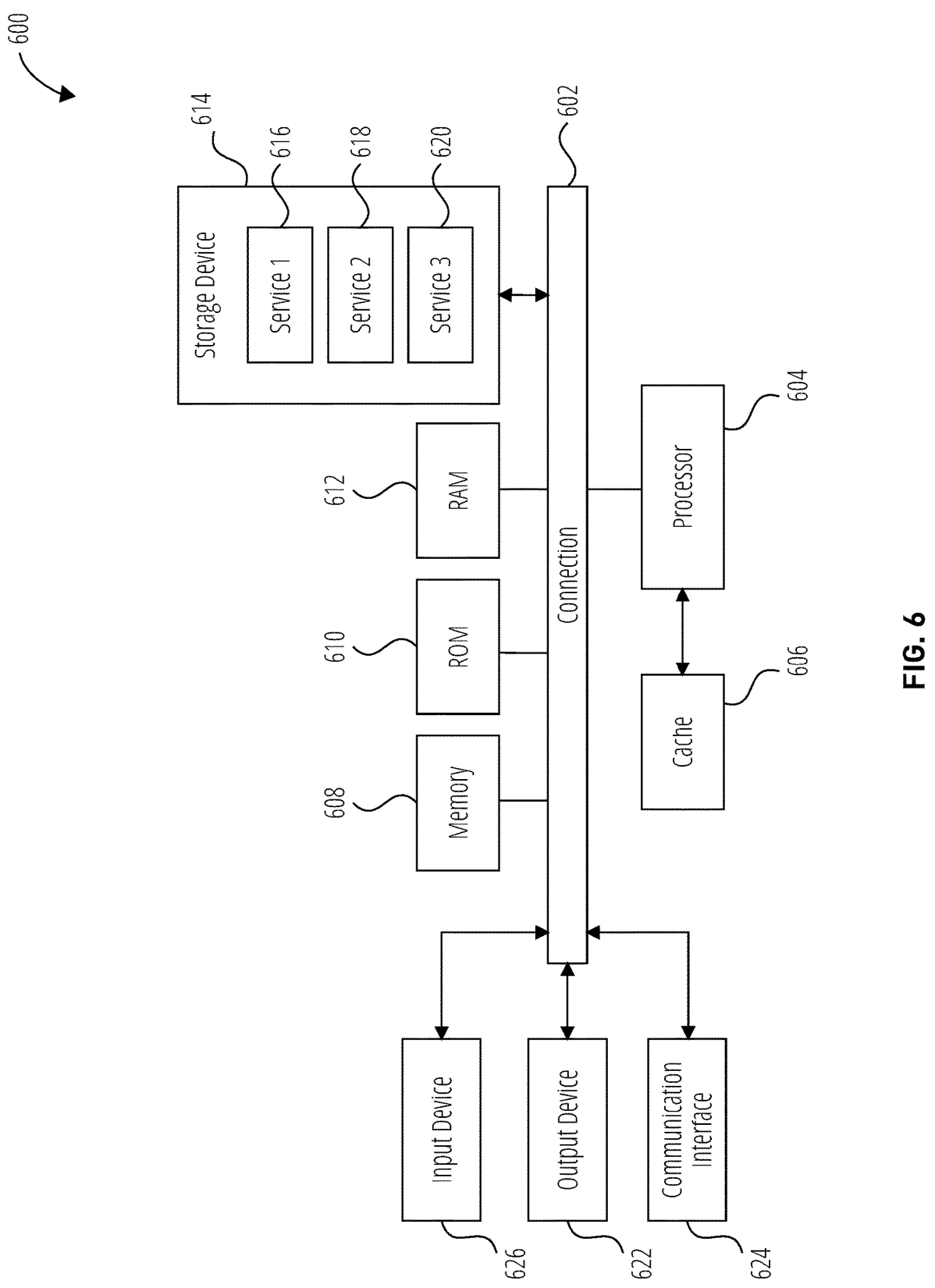
FIG. 6 shows an example of a system for implementing aspects of the present technology.

FIG. 6 shows an example of computing system 600, which can be for example any computing device making up the content management system 102, the object analysis and classification service 202, or any component thereof in which the components of the system are in communication with each other using connection 602. Connection 602 can be a physical connection via a bus, or a direct connection into processor 604, such as in a chipset architecture. Connection 602 can also be a virtual connection, networked connection, or logical connection.

In some embodiments, computing system 600 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example computing system 600 includes at least one processing unit (CPU or processor) 604 and connection 602 that couples various system components including system memory 608, such as read-only memory (ROM) 610 and random access memory (RAM) 612 to processor 604. Computing system 600 can include a cache of high-speed memory 606 connected directly with, in close proximity to, or integrated as part of processor 604.

Processor 604 can include any general purpose processor and a hardware service or software service, such as services 616, 618, and 620 stored in storage device 614, configured to control processor 604 as well as a special-purpose processor where software instructions are incorporated into the actual processor design. Processor 604 may essentially be a completely self-contained computing system, containing multiple cores or processors, a bus, memory controller, cache, etc. A multi-core processor may be symmetric or asymmetric.

To enable user interaction, computing system 600 includes an input device 626, which can represent any number of input mechanisms, such as a microphone for speech, a touch-sensitive screen for gesture or graphical input, keyboard, mouse, motion input, speech, etc. Computing system 600 can also include output device 622, which can be one or more of a number of output mechanisms known to those of skill in the art. In some instances, multimodal systems can enable a user to provide multiple types of input/output to communicate with computing system 600. Computing system 600 can include communication interface 624, which can generally govern and manage the user input and system output. There is no restriction on operating on any particular hardware arrangement, and therefore the basic features here may easily be substituted for improved hardware or firmware arrangements as they are developed.

Storage device 614 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 614 can include software services, servers, services, etc., that when the code that defines such software is executed by the processor 604, it causes the system to perform a function. In some embodiments, a hardware service that performs a particular function can include the software component stored in a computer-readable medium in connection with the necessary hardware components, such as processor 604, connection 602, output device 622, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

The present technology includes computer-readable storage mediums for storing instructions, and systems for executing any one of the methods embodied in the instructions addressed in the aspects of the present technology presented below:

Aspect 1. A method of automatically organizing objects into topics based on an analysis of a collection of objects, the method comprising: analyzing objects in a collection of objects for relevance to a first topic by a object analysis and classification service, the first topic defining one or more parameters for objects associated with the first topic, the collection of objects being a general collection of objects associated with a user account, the objects being of diverse object types and from diverse sources; tagging first objects in the collection of objects for relevance to the first topic as a result of the analyzing; and surfacing, in a topic summary user interface, a link to the first objects associated with the first topic and information descriptive of the first objects.

Aspect 2. The method of Aspect 1, wherein the information descriptive of the first object includes one or more of: a name of the first topic, a number of first objects associated with the first topic, a date range of last modified dates, user accounts with which the first objects are shared, pending action(s) relevant to the first objects, and insights derived from the first objects.

Aspect 3. The method of any of Aspects 1 to 2, wherein the topic summary user interface displays a plurality of widgets including a first widget and a second widget, wherein the first widget is associated with the first topic and displays the information descriptive of the first objects, and the second widget is associated with a second topic and displays information descriptive of second objects.

Aspect 4. The method of any of Aspects 1 to 3, wherein the object analysis and classification service is a platform that is configured to receive the one or more parameters for objects associated with the first topic and to identify the first objects based on the one or more parameters and to analyze the first objects, wherein the analysis is informed by the one or more parameters, wherein the analysis is based on a summarization of the one or more documents using a LLM.

Aspect 5. The method of any of Aspects 1 to 4, wherein the object analysis and classification service includes a clustering service, the clustering service is configured to cluster similar types of objects in the collection of objects associated with a user account into topic clusters.

Aspect 6. The method of any of Aspects 1 to 5, further comprising: identifying at least a portion of the first objects as objects located in a first topic cluster matching a topic identified in the first topic.

Aspect 7. The method of any of Aspects 1 to 6, wherein the object analysis and classification service includes a classification service, the classification service includes at least one machine learning algorithm configured to identify objects in the collection of objects that correspond with objects in a training set of objects.

Aspect 8. The method of any of Aspects 1 to 7, wherein the object analysis and classification service includes an LLM (large language model) prompt service, the LLM prompt service is configured to prompt a LLM with at least one prompt included as part of the first topic, wherein the LLM returns data or insights from the first objects based on the at least one prompt.

Aspect 9. The method of any of Aspects 1 to 8, wherein the first topic defines metadata for objects relevant to the first topic, the object analysis and classification service is configured to search for or filter the collection of objects associated with the user account to identify the first objects.

Aspect 10. The method of any of Aspects 1 to 9, wherein the object analysis and classification service includes a patterns service, the patterns service is configured to recognize a pattern in data in at least one object in the collection of objects associated with the user account based on a pattern defined by the first topic.

Aspect 11. The method of any of Aspects 1 to 10, wherein the first topic is a preconfigured topic.

Aspect 12. The method of any of Aspects 1 to 11, wherein the user account configures the parameters in the first topic.

Aspect 13. The method of any of Aspects 1 to 12, wherein the first topic is configured to identify tax-related objects for a specified tax period, the one or more parameters of the first topic include an identification of types of objects that are relevant, patterns that may occur in the types of objects that are relevant, a selection of a specific classification model that is configured to identify a tax object, one or prompts for an LLM to analyze objects that are relevant.

Aspect 14. The method of any of Aspects 1 to 13, further comprising: extracting relevant information from the first objects and inserting the relevant information into a tax form.

Aspect 15. A method comprising: receiving a user input in a topic summary user interface effective to trigger an option to add a widget associated with a first topic in the topic summary user interface; presenting options to configure the first topic; receiving selected items on the options; saving the first topic for access by the object analysis and classification service; and surfacing, in the topic summary user interface, a link to the first objects associated with the first topic and information descriptive of the first objects.

What is claimed is:

1. A method of automatically organizing objects into topics based on an analysis of a collection of objects, the method comprising:

receiving, via user input to a topic summary user interface at a client device, one or more parameters for identifying objects in the collection of objects relevant to a first topic;

analyzing, by at least one processor, the objects in the collection of objects for relevance to the first topic by an object analysis and classification service, the collection of objects being a general collection of objects associated with a user account, the objects being of diverse object types and from diverse sources, wherein the object types include directories, images, videos, documents, and code;

identifying a first object of a first object type based on the one or more parameters and a second object of a second object type, wherein the first object and the second object are part of the collection of objects and the first object type and the second object type are different;

tagging first objects in the collection of objects for relevance to the first topic as a result of the analyzing;

automatically surfacing, in the topic summary user interface, a user interface widget associated with the first topic and comprising information descriptive of the first objects and a link to the first objects;

receiving, in the topic summary user interface, an indication that the link to the first objects was activated; and providing for display in the topic summary user interface the first objects.

2. The method of claim 1, wherein the topic summary user interface displays a plurality of widgets including a first widget and a second widget, wherein the first widget is associated with the first topic and displays the information descriptive of the first objects, and the second widget is associated with a second topic and displays information descriptive of second objects.

3. The method of claim 1, wherein the object analysis and classification service is a platform that is configured to receive the one or more parameters for objects associated with the first topic and to identify the first objects based on the one or more parameters and to analyze the first objects.

4. The method of claim 1, wherein the object analysis and classification service includes a clustering service, the clustering service is configured to cluster similar types of objects in the collection of objects associated with the user account into topic clusters.

5. The method of claim 4, further comprising:

identifying at least a portion of the first objects as objects located in a first topic cluster matching a topic identified in the first topic.

6. The method of claim 1, wherein the object analysis and classification service includes a classification service, the classification service includes at least one machine learning algorithm configured to identify objects in the collection of objects that correspond with objects in a training set of objects.

7. The method of claim 1, wherein the object analysis and classification service includes an LLM (large language model) prompt service, and the LLM prompt service is configured to prompt an LLM with at least one prompt included as part of the first topic.

8. The method of claim 1, wherein the first topic defines metadata for objects relevant to the first topic, the object analysis and classification service is configured to search for or filter the collection of objects associated with the user account to identify the first objects.

9. The method of claim 1, wherein the object analysis and classification service includes a patterns service, the patterns service is configured to recognize a pattern in data in at least one object in the collection of objects associated with the user account based on a pattern defined by the first topic.

10. A computing system comprising:

at least one processor; and a memory storing instructions that, when executed by the at least one processor, configure the system to:

receive, via user input to a topic summary user interface at a client device, one or more parameters for identifying objects in a collection of objects relevant to a first topic;

analyze, by the at least one processor, the objects in the collection of objects for relevance to the first topic by an object analysis and classification service, the collection of objects being a general collection of objects associated with a user account the objects being of diverse object types and from diverse sources, wherein the object types include directories, images, videos, documents, and code;

identify a first object of a first object type based on the one or more parameters and a second object of a second object type, wherein the first object and the second object are part of the collection of objects and the first object type and the second object type are different;

select first objects in the collection of objects for relevance to the first topic as a result of the analyzing;

automatically surface, in the topic summary user interface, a user interface widget associated with the first topic and comprising information descriptive of the first objects and a link to the first objects;

receive, in the topic summary user interface, an indication that the link to the first objects was activated; and provide for display in the topic summary user interface the first objects.

11. The computing system of claim 10, wherein the topic summary user interface displays a plurality of widgets include a first widget and a second widget, wherein the first widget is associated with the first topic and displays the information descriptive of the first objects, and the second widget is associated with a second topic and displays information descriptive of second objects.

12. The computing system of claim 10, wherein the object analysis and classification service is a platform that is configured to receive the one or more parameters for objects associated with the first topic and to identify the first objects based on the one or more parameters and to analyze the first objects.

13. The computing system of claim 10, wherein the instructions further configure the system to:

identify at least a portion of the first objects as objects located in a first topic cluster matching a topic identified in the first topic.

14. The computing system of claim 10, wherein the object analysis and classification service includes an LLM (large language model) prompt service, and the LLM prompt service is configured to prompt an LLM with at least one prompt included as part of the first topic.

15. A non-transitory computer-readable storage medium, the computer-readable storage medium including instructions that when executed by at least one processor, cause the at least one processor to:

receive, via user input to a topic summary user interface at a client device, one or more parameters for identifying objects in a collection of objects relevant to a first topic;

analyze, by the at least one processor, the objects in the collection of objects for relevance to the first topic by an object analysis and classification service, the collection of objects being a general collection of objects associated with a user account, the objects being of diverse object types and from diverse sources, wherein the object types include directories, images, videos, documents, and code;

identifying a first object of a first object type based on the one or more parameters and a second object of a second object type, wherein the first object and the second object are part of the collection of objects and the first object type and the second object type are different;

select first objects in the collection of objects for relevance to the first topic as a result of the analyzing;

automatically surface, in the topic summary user interface, a user interface widget associated with the first topic and comprising information descriptive of the first objects and a link to the first objects;

receive, in the topic summary user interface, an indication that the link to the first objects was activated; and provide for display in the topic summary user interface the first objects.

16. The computer-readable storage medium of claim 15, wherein the topic summary user interface displays a plurality of widgets include a first widget and a second widget, wherein the first widget is associated with the first topic and displays the information descriptive of the first objects, and the second widget is associated with a second topic and displays information descriptive of second objects.

17. The computer-readable storage medium of claim 15, wherein the object analysis and classification service is a platform that is configured to receive the one or more parameters for objects associated with the first topic and to identify the first objects based on the one or more parameters and to analyze the first objects.

18. The computer-readable storage medium of claim 15, wherein the object analysis and classification service includes a clustering service, the clustering service is configured to cluster similar types of objects in the collection of objects associated with the user account into topic clusters.

19. The computer-readable storage medium of claim 18, wherein the instructions further configure the at least one processor to:

identify at least a portion of the first objects as objects located in a first topic cluster matching a topic identified in the first topic.

20. The computer-readable storage medium of claim 15, wherein the object analysis and classification service includes an LLM (large language model) prompt service, and the LLM prompt service is configured to prompt an LLM with at least one prompt included as part of the first topic.

* * * * *